United States Patent [19]

Slavinski et al.

[11] 3,901,108
[45] Aug. 26, 1975

[54] ONE-SEAT HOLDER FOR CHANGEABLE TOOL UNITS

[75] Inventors: Ivan Assenov Slavinski, 1, Balchik St.; Eduard Todorov Burgudjiev, 28, Schmid St.; Dmitri Dmitrievich Vukolov, 73, Complex Mladost; Todor Dimitrov Angelov, 9, Sheinovo St., all of Sofia, Bulgaria

[73] Assignee: DSO "ZMM", Sofia, Bulgaria

[22] Filed: Apr. 8, 1974

[21] Appl. No.: 458,880

[30] Foreign Application Priority Data
Apr. 9, 1973 Bulgaria.................................. 23237

[52] U.S. Cl. ................................ 82/36 R; 82/36 R
[51] Int. Cl. ............................................. B23b 29/00
[58] Field of Search ................. 82/36 R, 36 A, 36 B

[56] References Cited
UNITED STATES PATENTS

| | | | |
|---|---|---|---|
| 2,929,274 | 3/1960 | Goss................................ | 82/36 R X |
| 3,513,734 | 5/1970 | Burroughs et al.................. | 82/36 R |
| 3,603,186 | 9/1971 | Vigor et al.......................... | 82/36 R |
| 3,793,708 | 2/1974 | Watanabe........................... | 82/36 R |

*Primary Examiner*—Harrison L. Hinson

[57] ABSTRACT

One-seat holder for changeable tool units for lathes with digital program control and tool magazines, such holder clamping the tool units along the three rectangular coordinates. The holder includes two hydraulically actuated clamping devices. One of such devices has a shaft with an eccentric head which selectively engages a land or rib on the tool unit when the shaft is turned, the shaft also having a cam which cooperates with a cam follower to thrust the shaft axially; shortly thereafter, the eccentric head on the shaft clampingly engages the rib on the tool unit. The shaft is actuated by a first hydraulic cylinder. The other hydraulic clamping means includes a second hydraulic cylinder which drives means which draws two opposed tool unit clamping jaws toward each other in a plane which lies normal to the direction of the clamping action of the eccentric head on the shaft. Means is provided drivingly to couple the piston rod of the two hydraulic motors, whereby the first clamping action, that of the eccentric head against the rib, takes place somewhat before the opposed jaws clamp the tool unit. The opposed jaws preferably are mirror images of each other, and each has two surfaces disposed at a right angle with respect to each other and matingly engaging aligned formations on opposite sides of the tool unit.

8 Claims, 4 Drawing Figures

ONE-SEAT HOLDER FOR CHANGEABLE TOOL UNITS

This invention relates to one-seat holders for changeable tool units for lathes with digital program control and tool magazines. A prior tool holder is known in which the clamping of the tool units is accomplished along the three rectangular coordinates and at the same time by just one tightening effort. In this holder the fixing and the clamping of the tool units is done by means of Hirth gears. This is an expensive construction however, requiring high precision in the production of the holder itself as well as of the tool units.

Another holder is known in which successive clamping takes place along the three rectangular coordinates. In this holder, the fixing and clamping takes place first along two coordinates, along a prism and a plane by means of an eccentric, and then the tool unit is fastened to the base of the tool holder by means of a nut. One of the disadvantages of this tool holder lies in the fact that the delivering of the tool unit into the holder takes place along an axis perpendicular to the axis of the tool spindle of the machine. This requires the leading of the tool holder away from the working area of the machine during the carrying on of the tool changing operation. There are known holders in which the clamping of the tool units is done along only two coordinates, by means of two prisms. During tool changing the tool units are only pressed by an external device along the third coordinate. This construction entails the danger of dislocation of the tool unit with respect to the tool unit holder, because of vibrations which such elements encounter during operation of the machine. In addition, the parts of such tool holder mechanism, including the tool holder and the tool units, have to be made with a high precision.

The present invention has among its objects the overcoming of the above-mentioned disadvantages of known constructions of tool changing mechanisms, by the creation of a one-seat holder for changeable tool units in which the delivery of the tool units into the holder takes place in a direction parallel to the axis of the machine spindle, at the end of which the clamping of the tool units takes place simultaneously along three rectangular coordinates. In the illustrative embodiment of the tool holder of the invention, the clamping of the tool units in the holder is effected by means of an eccentric shaft and the self-adjusting nut on the clamp. The tool holder includes two hydraulic clamping devices. One of such clamping devices includes a shaft with an eccentric head, such shaft having a box cam groove thereinto, such groove cooperating with a cam following pin, so that rotation of this shaft causes it to reciprocate along its axis. Such reciprocation of the shaft not only causes the eccentric head thereof clampingly to engage a rib or land on the tool holder, but also causes the eccentric head of the shaft to move out of its seat in which it is out of the path of the rib on the tool unit as the tool unit approaches its seat on the tool holder. Rotation of such shaft is effected by a rack meshing with a pinion fixed to the shaft, the rack being driven by a first reciprocating hydraulic motor. The other clamping device includes a clamp with a self-adjusting nut which is maintained from rotation with respect to the body of the tool holder, the nut receiving a screw shaft and being driven by a second rack which is in mesh with a second pinion, which is mounted on the screw shaft. The second rack is driven by a second reciprocating hydraulic motor. The two racks are connected together, in this case being formed on different surfaces of the same reciprocable rod, so as to maintain the two clamping devices in synchronism.

Contactless transformers are mounted on the body of the tool holder, such transformers interacting with coded members on the tool unit so as to control the unit that has been clamped in the holder. A flat nozzle for blowing off shavings and dust from the tools during tool changing is fixed to the front part of the holder. On the other side of the tool holder there is fixed a rack with nozzles in which compressed air and cooling liquid are delivered for the cleaning of the supporting surfaces of the tool units during the tool changing operation.

The one-seat holder, in accordance with the invention, successively clamps the tool unit along the three rectangular coordinates, whereby the tightening effort is preserved even after the tool unit has been changed. A high precision of tool positioning is achieved in this manner, since the clampings are graded not only in time but also in force; in addition, the danger of displacement of the tool unit with respect to the holder, due to vibration of the machine during its operation, is avoided.

Another advantage is the fact that the delivery of the tool unit to the tool holder is performed in a direction parallel to the axis of the spindle of the machine, the tool unit being fed into the tool holder in the direction towards the work pieces, while the control of the code unit of the tool holder takes place in the direction away from work piece. Besides, control of the code unit by the code members thereon is performed in the holder after the tool unit has been clamped therein. In this way, the correct choice of the right tool unit is controlled, and a check is provided whether the tool unit has been properly clamped in the tool holder. The device for blowing off chips and dirt from the tool unit and tool holder, while tool changing is taking place, is another advantage of the tool holder of the invention.

For a better understanding of the invention, reference should be made to the accompanying drawings in which there is illustrated a preferred embodiment of the one-seat holder for changeable tool units, and its construction and manner of operation.

Figure 1:
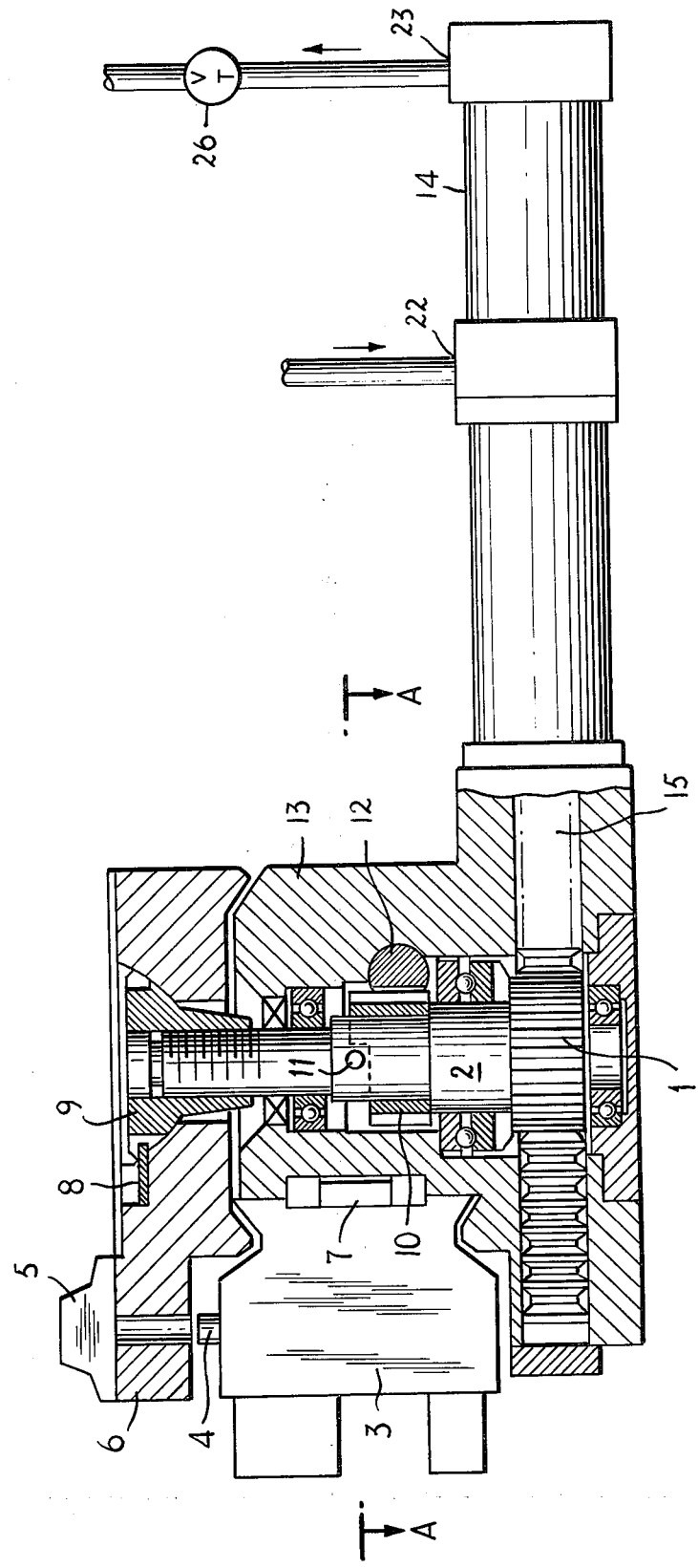
FIG. 1 shows the combination of the tool holder and the tool unit cooperating therewith, the tool holder being shown with its clamps in open position, the view of the tool holder being partially in elevation and partially in longitudinal cross-section.

In the drawings, a tool unit 3 having opposed 90° dove tail configurations on the opposite sides thereof, adjacent its right hand end, as shown, is received between a fixed jaw of the body 13 of the tool holder and a movable clamp jaw 6, such jaws having opposed, aligned formations thereon mating with the 90° dove tail formations of the tool unit. The clamp jaw 6 is selectively pulled downwardly into clamping engagement with the tool unit 3 by a reciprocating hydraulic motor or cylinder 14 to the piston rod of which there is attached a rack 15 which engages with a pinion 1 affixed to a vertical shaft 2 (FIG. 1). The upper end of the shaft 2 is threaded, and is threadedly received in a self-adjusting nut 9 which is mounted in a generally frusto-conical seat in the upper surface of the clamp jaw 6. Nut 9 is retained from rotation with respect to jaw 6 by a plate 8.

It will be seen that the main surfaces of the dove tail shapes of the sides of tool unit 3 are disposed at right angles with respect to each other, and that the main surfaces of the mating formations on the fixed and movable jaws of the tool holder are likewise disposed at right angles with respect to one another. Thus, when the jaw 6 is pulled downwardly toward the fixed jaw on the body 13, clamping of the tool unit takes place along two coordinates, located in the plane of the paper of FIG. 1, said coordinates being disposed at right angles with respect to each other.

Figure 2:
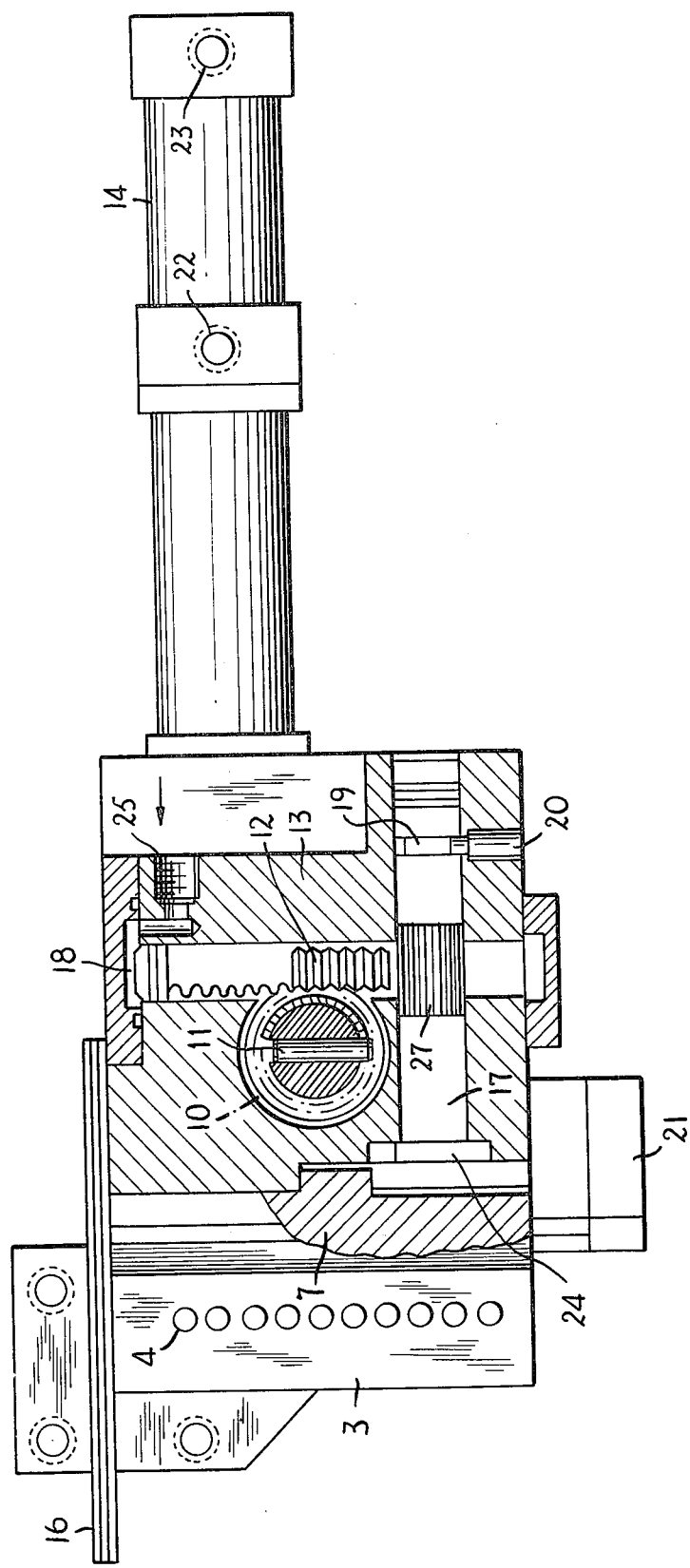
FIG. 2 is a view in cross-section at right angles to the section of FIG. 1, the section being taken along the line A—A in FIG. 1, certain of its parts being shown in elevation.

Clamping along the third coordinate, disposed at right angles to the above discussed two coordinates, takes place between the eccentric head 24 on the shaft 17, and the lower surface (FIGS. 2 and 4) of the rib or land 7 on the tool unit 3.

Turning now to the details of the contruction of the one-seat holder shown in the drawings, such holder has a body 13 in which the shaft 2 is journalled in a bearing, there being a pinion 1 affixed to the shaft 2, as shown. A reciprocable hydraulic motor 14 has a piston rod to which there is affixed a toothed rack 15 which meshes with the pinion 1. When hydraulic fluid under pressure is fed into the port 23 and exhausted from the port 22 (FIGS. 2 and 4), the rack 15 is moved to the left, in the position of FIG. 1. When hydraulic fluid under pressure is introduced into the port 22, and exhausted from the port 23, the rack 15 is moved to the right, into the position of FIG. 3, wherein the movable clamp jaw 6 has been moved against the tool holder which is then being positioned on the tool holder.

The rate of movement of the rack 15 to the right can be varied by the rate of exhaust of fluid from the port 23, a variable throttling exhaust valve 26 being provided for that purpose, as shown.

Rotatably mounted on the shaft 2 is a stepped pinion cam having shoulders on its hub which are generally 180° apart, there being cross pin 11 through the shaft 10, one end of such pin selectively engaging one or the other of the shoulders on the hub of the pinion 10. The pinion 10 is thus free for movement through approximately 180° with respect to the shaft until a respective shoulder on the hub thereof engages the pin 11; in other words, there is provided a lost-motion connection between pinion 10 and shaft 2.

In the body 13 of the tool holder there is a hydraulic cylinder 18 having a piston rod to the end of which there is affixed a toothed rack 12 which has two toothed sides located at right angles to each other, one side of the rack 12 meshnig with the gear segment 10, while the other side of such rack meshes with a pinion 27 which is cut into the shaft 17. The end of the shaft shown at the right end in FIGS. 2 and 4 has a box cam 19 cut therein, the inner end of a fixed pin 20 functioning as a cam follower protruding into the cam 19. When the shaft 17 turns, therefore, it reciprocates in the direction along its axis.

Inductive contactless transformer 5 is located at the front part of the clamping jaw 6. Such transformer 5 performs the checking of the code number of the tool unit 3 after the tool unit has been clamped into the holder. Each tool unit 3 has pins for coding the number of the tool unit, as we have seen, the rib or land 7 of the tool unit 3 is used for intially pressing the tool unit to the body 13 of the tool holder by the eccentric shaft 17.

The flat nozzle 16, for blowing off shavings and dust from the tools while a change is going on, are situated in the front part of the holder. Fixed on the other side of the holder is a rack 21 with nozzles to which compressed air and cooling liquid are delivered for cleansing the supporting surfaces of the tool units during a tool change. The tool unit is placed in a corresponding bed of the holder, formed by the supporting surfaces of the body 13, and the supporting surface of the clamp 6, while the rib 7 engages the corresponding step of the body 13. When the clamping jaw 6 is open, it is lifted about 0.5 mm by means of coil compression spring (not shown).

A tool unit 3 is clamped in the tool holder in the following manner: hydraulic liquid under pressure is fed at the same time from the same source and under the same pressure to the port 22 of the hydraulic cylinder 14 and the port 25 of the hydraulic cylinder 18. The throttle valve 26 for the exit port 23 of the cylinder 14 is adjusted so that movement of the toothed rack 15, set in motion by the piston of the cylinder 14, is slower than the movement of the special toothed rack 12. The speed of movement of the special toothed rack 12 is limited by means of the speed of rotation of shaft 2 and by means of the lost-motion engagement of the pin 11 against a shoulder of the pinion segment 10. The movement of the special toothed rack 12 is transferred to the pinion segment 10 and to the pinion 27 on the eccentric shaft 17, at the same time. When the eccentric shaft 17 is turned by means of the cam 19 and cam follower pin 20, it is first led forward toward the tool unit 3, and its further rotation causes its eccentric head to thrust land or rib 7 against the corresponding step of the body 13. When this is going on, the toothed rack 15 keeps moving, whereby the toothed wheel 1 rotates the shaft 2. Rotation of the shaft 2 screws it into the self-adjusting nut 9, which draws the clamp jaw 6 downwardly against the tool 3, thus completing the clamping of the tool unit 3 along the two right-angled coordinates in the plane of the paper of FIGS. 1 and 3, as above explained.

It will be seen that there is a synchronized clamping of the tool unit 3 along three rectangular coordinates, the first auxiliary pressing of the tool unit 3 taking place along the longitudinal coordinate being effected by the eccentric shaft 17, and the second, main clamping being performed by the clamp 6 and taking place along the other two rectangular coordinates.

Figure 3:
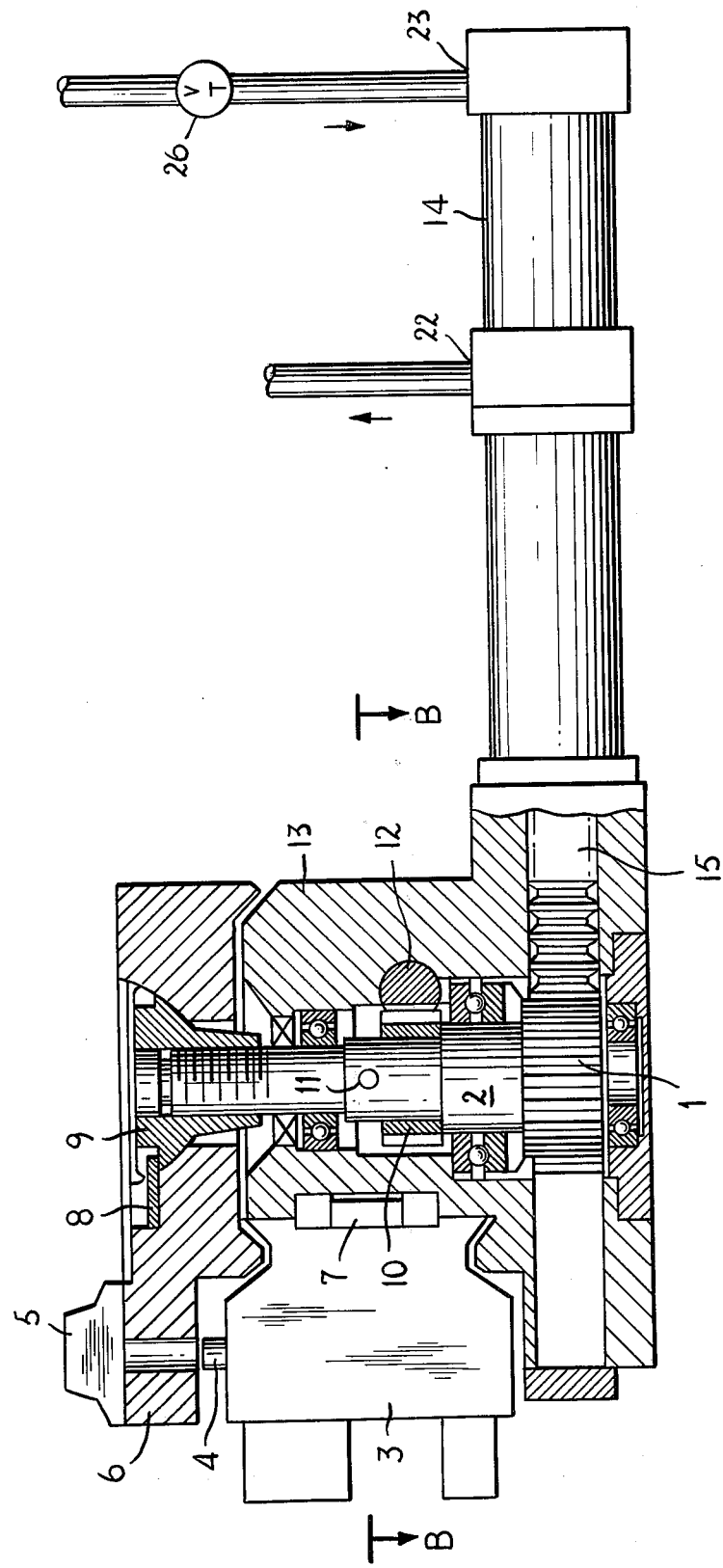
FIG. 3 is a view similar to FIG. 1 but with the clamps of the tool holder in closed position.
Figure 4:
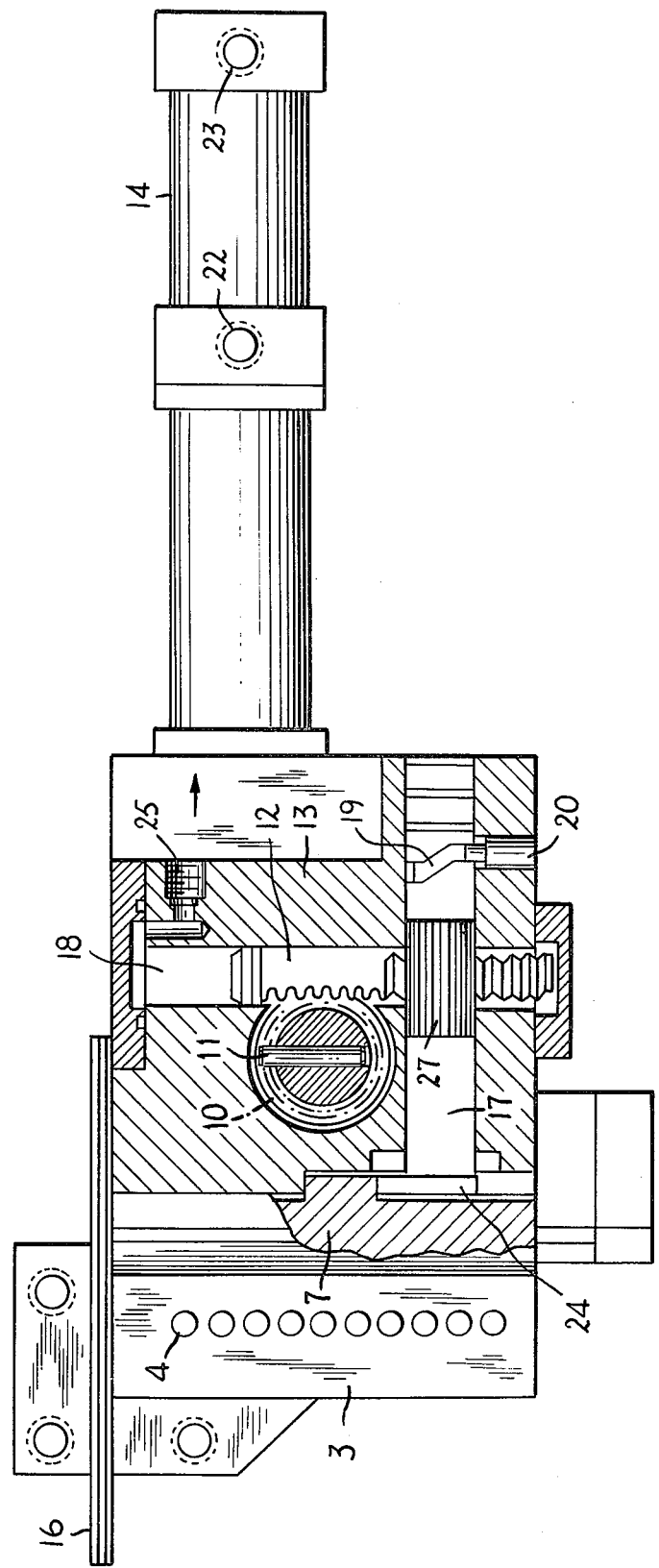
FIG. 4 is a view in cross-section taken along a plane at right angles to the planes of FIG. 3, the section being taken along the line B—B in FIG. 3.

When it is desired to release the tool unit 3 from the tool holder, hydraulic fluid under pressure is supplied to the cylinder 14 through the port 23 thereof, as indicated by the arrows in FIGS. 3 and 4. The shaft 2 then turns in the opposite direction and releases the self-adjusting nut 9 in the clamp 6, which is lifted by the coil compression springs (not shown) and releases the tool unit 2. Upon further rotation of shaft 2, the protruding end of the cross-pin 10 engages the other shoulder of the pinion segment 10 and starts to rotate it, whereby the special toothed rack 12, connected with it, goes back to its initial position (FIG. 2) and in so doing rotates the eccentric shaft 17 in the opposite direction. The eccentric head on the shaft 17 releases land 7 and then moves back to the right into the seat provided for it in the body 13. The thus released tool unit 3 is then led away in a synchronized manner, after which the tool unit is replaced by another one.

The one-seat holder for changeable tool units, according to the present invention, can be used to advantage in lathes with digital program control and a tool magazine.

Although the invention is described and illustrated with reference to one preferred embodiment thereof, it is to be expressly understood that it is in no way limited to the disclosure of such a preferred embodiment, but is capable of numerous modifications within the scope of the appended claims.

What is claimed is:

1. In the combination of one-seat holder and a changeable tool unit supported thereby, the tool holder having opposite aligned similar dove tailed seats thereof, the holder having opposed aligned jaws matingly received within said seats on the tool unit, and means for selectively clampingly pulling said jaws together to secure the tool unit on the holder and for moving the jaws apart to release the tool unit from the holder, the clamping effort exerted by the jaws upon the tool unit extending in two directions substantially at right angles to each other and located in a first plane, the improvement which comprises a rib on the tool unit which extends longitudinally along said first plane and in a direction at right angles to such plane into a recess in the body of the holder, said recess having a shoulder which closely confronts the lateral surface of the rib on the tool unit when the tool unit is introduced into the holder, the means for clampingly drawing the two jaws together comprising a first reciprocable hydraulic motor, a shaft journalled in the tool holder for rotation about and reciprocation along its axis, the shaft having an eccentric head which selectively functions to press the lateral surface of the rib on the tool unit against the shoulder of the groove in the tool holder when the shaft is turned into one of its terminal angular positions, means for retracting the shaft axially out of the alignment with the rib on the tool unit when the shaft is turned in the opposite direction, a second reciprocable hydraulic motor for rotating said shaft, and mechanical means drivingly connecting and synchronizing the shaft with the means for drawing the opposed jaws together, said last-named means being so constructed and arranged that the eccentric head on the shaft clamps the rib on the tool unit against the confronting shoulder of the groove in the holder upon the clamping of the tool unit in the holder to secure the tool unit on one rectangular coordinate, and thereafter the opposed jaws are brought together to clamp the tool unit along a second and third coordinate disposed substantially at right angle with respect to each other in a plane which is disposed substantially normal to said first coordinate.

2. A one-seat holder for changeable tool units in accordance with claim 1, wherein the means for pulling the jaws together comprises a rotatable threaded second shaft journalled in the support for one of said jaws, and a nut threadedly engaged with said second shaft and secured to the other of said jaws, and wherein the means for drivingly connecting and synchronizing the rotation of the first shaft with the means for pulling the jaws clampingly together comprises a slide having rack gears along two different sides thereof, a pinion mounted on the first shaft meshing with one of said rack gears, and a pinion mounted on the screw threaded shaft meshing with the other of said rack gears on the slide.

3. A one-seat holder for changeable tool unit according to claim 2, comprising a lost-motion connection between the second screw threaded shaft and the pinion mounted thereon, whereby said pinion rotates freely with respect to the second shaft through a predetermined angle before it becomes positively drivingly connected to the second shaft.

4. A one-seat holder for a changeable tool units according claim 3, comprising means for feeding the two reciprocable hydraulic motors with hydraulic pressure fluid from the same pressure souce and at the same pressure.

5. A one-seat holder for changeable tool units according to claim 1, comprising a hydraulic conduit circuit for the first hydraulic motor, a throttle valve in the hydraulic conduit circuit of said first hydraulic motor, said throttle valve being adjustable to cause the second recited hydraulic motor to be operated in a tool unit clamping direction more slowly than the first recited reciprocable hydraulic motor.

6. A one-seat holder for changeable tool units according to claim 5, wherein said adjustable throttle valve is disposed in the conduit which exhausts hydraulic fluid from the first hydraulic motor when such motor is moving the opposed jaws in the tool unit clamping direction.

7. A one-seat holder for changeable tool units according to claim 1, comprising a plurality of inductive contactless transformers disposed on one of the clamping jaws for identifying the tool unit which is mounted therebetween.

8. A one-seat holder for changeable tool units according to claim 1, comprising a flat nozzle fastened to a front part of the tool unit holder, and a rack on the other side on the tool holder provided with nozzles for discharging a cooling and cleaning flluid against the clamping surfaces of the tool unit and the tool unit holder.

* * * * *